United States Patent
Rayanki et al.

(10) Patent No.: US 9,717,107 B2
(45) Date of Patent: Jul. 25, 2017

(54) METHOD FOR PEER-TO-PEER DATA TRANSFER USING WIRELESS LOCAL AREA NETWORK RADIO EQUIPMENT

(71) Applicant: Motorola Mobility LLC, Chicago, IL (US)

(72) Inventors: Sreenivasulu Rayanki, Cupertino, CA (US); Himanshu R Lokre, Chicago, IL (US); Yuanliang Lu, Glenview, IL (US); Nitya Reddy, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 204 days.

(21) Appl. No.: 14/644,577

(22) Filed: Mar. 11, 2015

(65) Prior Publication Data

US 2016/0205712 A1 Jul. 14, 2016

Related U.S. Application Data

(60) Provisional application No. 62/102,413, filed on Jan. 12, 2015.

(51) Int. Cl.
| | |
|---|---|
| H04L 29/06 | (2006.01) |
| H04W 76/02 | (2009.01) |
| H04W 8/00 | (2009.01) |
| H04W 84/12 | (2009.01) |

(52) U.S. Cl.
CPC ......... *H04W 76/023* (2013.01); *H04W 8/005* (2013.01); *H04W 84/12* (2013.01)

(58) Field of Classification Search
CPC .... H04W 76/023; H04W 8/005; H04W 84/12
See application file for complete search history.

(56) References Cited

U.S. PATENT DOCUMENTS

| 8,804,683 B2 | 8/2014 | Shimura | |
|---|---|---|---|
| 8,929,350 B1 | 1/2015 | Vleugels et al. | |
| 2011/0010340 A1* | 1/2011 | Hung | H04L 12/1886 707/623 |
| 2012/0244847 A1* | 9/2012 | Chandra | H04W 4/023 455/414.3 |
| 2012/0317641 A1* | 12/2012 | Coskun | H04L 63/1425 726/22 |

(Continued)

FOREIGN PATENT DOCUMENTS

KR 1020140020179 A 2/2014

OTHER PUBLICATIONS

Search Report dated Aug. 15, 2016 for patent application No. GB1603694.9.

*Primary Examiner* — Jay P Patel
(74) *Attorney, Agent, or Firm* — Cygan Law Offices P.C.; Joseph T. Cygan (57) ABSTRACT

A disclosed method includes preventing a first mobile device from connecting to configured networks having connectivity information stored in a configured networks list stored in memory of the first mobile device, establishing a peer-to-peer connection with a second mobile device, performing a data transfer from the first mobile device to the second mobile device over the peer-to-peer connection while continuing to prevent the first mobile device from connecting to the configured networks, and enabling the first mobile device to connect to the configured networks after completion of the data transfer.

20 Claims, 4 Drawing Sheets

(56) References Cited

U.S. PATENT DOCUMENTS

| | | | |
|---|---|---|---|
| 2013/0065627 A1* | 3/2013 | Jung | H04L 67/104 |
| | | | 455/515 |
| 2013/0100944 A1 | 4/2013 | Kwon et al. | |
| 2013/0297810 A1 | 11/2013 | Ho et al. | |
| 2014/0274179 A1* | 9/2014 | Zhu | H04W 52/243 |
| | | | 455/509 |
| 2016/0057602 A1* | 2/2016 | Rayanki | H04W 8/005 |
| | | | 370/254 |
| 2016/0234711 A1* | 8/2016 | Wang | H04L 61/2592 |
| 2016/0302026 A1* | 10/2016 | Lee | H04W 8/005 |

* cited by examiner

- PRIOR ART -

METHOD FOR PEER-TO-PEER DATA TRANSFER USING WIRELESS LOCAL AREA NETWORK RADIO EQUIPMENT

CROSS-REFERENCE TO RELATED APPLICATIONS

The present application claims priority to U.S. Provisional Patent Application No. 62/102,413, filed Jan. 12, 2015, entitled "METHOD FOR PEER-TO-PEER DATA TRANSFER USING WIRELESS LOCAL AREA NETWORK RADIO EQUIPMENT" which is hereby incorporated by reference herein in its entirety, and which is assigned to the same assignee as the present application.

FIELD OF THE DISCLOSURE

The present disclosure relates generally to wireless local area network radio operation in a mobile device and more particularly to peer-to-peer mobile device connectivity.

BACKGROUND

Mobile devices such as smartphones usually include radio equipment for wireless local area network connectivity in addition to radio equipment for wireless wide area network connectivity such as cellular network communication equipment.

Challenges exist when attempting to use the wireless local area network radio equipment for peer-to-peer connections between devices. For example, data transfer speeds may be low because of radio resource utilization of the radio equipment as it performs multiplexing between connections. Further, if peer-to-peer data transfer connections are lost, the connection may not be readily reestablished due to connectivity parameters predetermined for the radio equipment and which are not in control of the user. In other words, the radio equipment may scan for networks and form a network connection based on desirable radio connectivity conditions rather than establishing the specific connection that may be desired by the user.

DETAILED DESCRIPTION

The present disclosure provides methods and apparatuses for facilitating peer-to-peer data transfers between mobile devices using the mobile devices' respective wireless local area network (WLAN) radio equipment to establish the peer-to-peer connection. In accordance with the embodiments, the source mobile device is prevented from scanning for known networks during the data transfer operation and until the data transfer operation is completed. Accordingly, data transfer is performed more rapidly and with less battery drain than would occur using prior methods.

One disclosed method includes preventing a first mobile device from connecting to configured networks that have connectivity information stored in memory of the first mobile device; establishing a peer-to-peer connection with a second mobile device; performing a data transfer from the first mobile device to the second mobile device over the peer-to-peer connection while continuing to prevent the first mobile device from connecting to the configured networks; and enabling the first mobile device to connect to the configured networks after completion of the data transfer.

The first mobile device detects the second mobile device by scanning for networks. In some embodiments, the first mobile device is prevented from connecting to configured networks by disabling the configured networks in a configured networks list stored in memory of the first mobile device.

In one embodiment, the method may include sending an indication to the second mobile device that the data transfer has been completed; and enabling the configured networks in the configured networks list of the first mobile device in response to completion of the data transfer. In the case of a lost connection, the first mobile device will detect that the peer-to-peer connection with the second mobile device has been lost, and will determine if the data transfer to the second mobile device has been completed or not. If the data transfer has not been completed. The first mobile device will reestablish the peer-to-peer connection with the second mobile device to resume the data transfer while continuing to refrain from connecting to configured networks.

In one embodiment, preventing the first mobile device from connecting to configured networks may be accomplished by sending a command from an application layer of the first mobile device to a radio baseband layer of the first mobile device, to disable configured networks. Sending the command may be implemented by performing a remote call of an application programming interface of the first mobile device radio baseband layer.

The configured networks may include a user's home network such that preventing the first mobile device from connecting to configured networks includes preventing the first mobile device from connecting to the home network.

The first mobile device may obtain connectivity information from the second mobile device using various methods, and will store the second mobile device connectivity information. In one embodiment, the connectivity information for the second mobile device may be obtained by reading a barcode using camera equipment of the first mobile device. The barcode located on the second mobile device, and includes connectivity information for the second mobile device. The first mobile device will store the connectivity information for the second mobile device for use in establishing the peer-to-peer connection.

One disclosed embodiment is a system with a first mobile device and a second mobile device. Each mobile device respectively includes a processor; wireless local area network (WLAN) radio baseband hardware, operatively coupled to the processor; and memory, operatively coupled to the processor and to the wireless local area network radio baseband hardware. The first mobile device processor is configured to prevent the first mobile device WLAN radio baseband hardware from connecting to configured networks having connectivity information stored in the first mobile device memory, and to establish a peer-to-peer connection with the second mobile device using the respective WLAN radio baseband hardware. A data transfer from the first mobile device to the second mobile device is performed over the peer-to-peer connection while continuing to prevent the first mobile device WLAN radio baseband hardware from connecting to the configured networks. After completion of the data transfer, the first mobile device WLAN radio baseband hardware can again connect to the configured networks. The disclosed system embodiments are operative to perform all of the other disclosed methods of operation.

Figure 1:
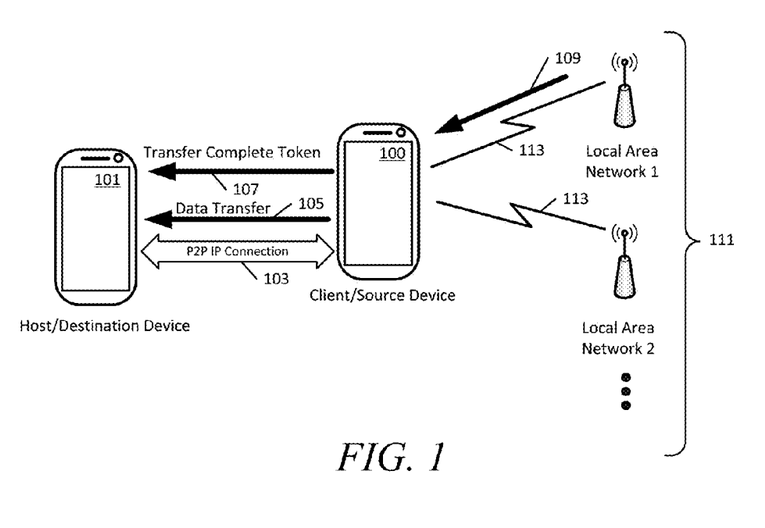
FIG. 1 is a diagram showing establishing a peer-to-peer connection and performing a data transfer operation between a first mobile device and a second mobile device in accordance with an embodiment.

Turning now to the drawings, FIG. 1 is a diagram showing establishing a peer-to-peer connection 103 and performing a data transfer 105 operation between a first mobile device 100 and a second mobile device 101 in accordance with an embodiment. The first mobile device 100 executes a client-side data migrate application and is a source device for the data transfer 105 to the second mobile device 101. The second mobile device 101 executes a host-side data migrate application and is a destination device for the data transfer 105. The data transfer 105 is accomplished using the peer-to-peer connection 103 which may be an Internet Protocol (IP) connection in some embodiments. When the first mobile device 100 determines that the data transfer 105 has been completed, it sends an indication 107, such as a transfer complete token, that informs the second mobile device 101 that the first mobile device 100 is finished sending data. The data transfer 105 may be a discrete file transfer, streaming media, or other user data transfer, etc.

The first mobile device 100 is operative to scan for, and connect to, various configured networks 111. The first mobile device 100 includes a memory which stores a configured network list which may contain, for example, connectivity information for local area network 1, local area network 2, and various other local area networks, etc. These "configured networks" are networks that the first mobile device 100 had connected with previously and for which the user has input appropriate connectivity information which is stored in the configured networks list. Various configured networks 111 may communicate with the first mobile device 100 using a WLAN radio link 113. The WLAN radio link 113 may utilize various technologies such as, for example, Wi-Fi™ also referred to as an IEEE 802.11b, etc., connection. However, other WLAN radio interfaces may be used in the various embodiments. The first mobile device 100 may establish a WLAN radio link 113 connection with one of the configured networks 111 and may perform a download operation 109 to obtain the client-side data migrate application. The first mobile device 100 also uses its WLAN radio baseband hardware to form the peer-to-peer connection 103. That is, the peer-to-peer connection 103 is also accomplished using a radio link such as IEEE 802 11b, or a like radio link, which is used to establish WLAN radio connections with the configured networks 111.

Figure 2:
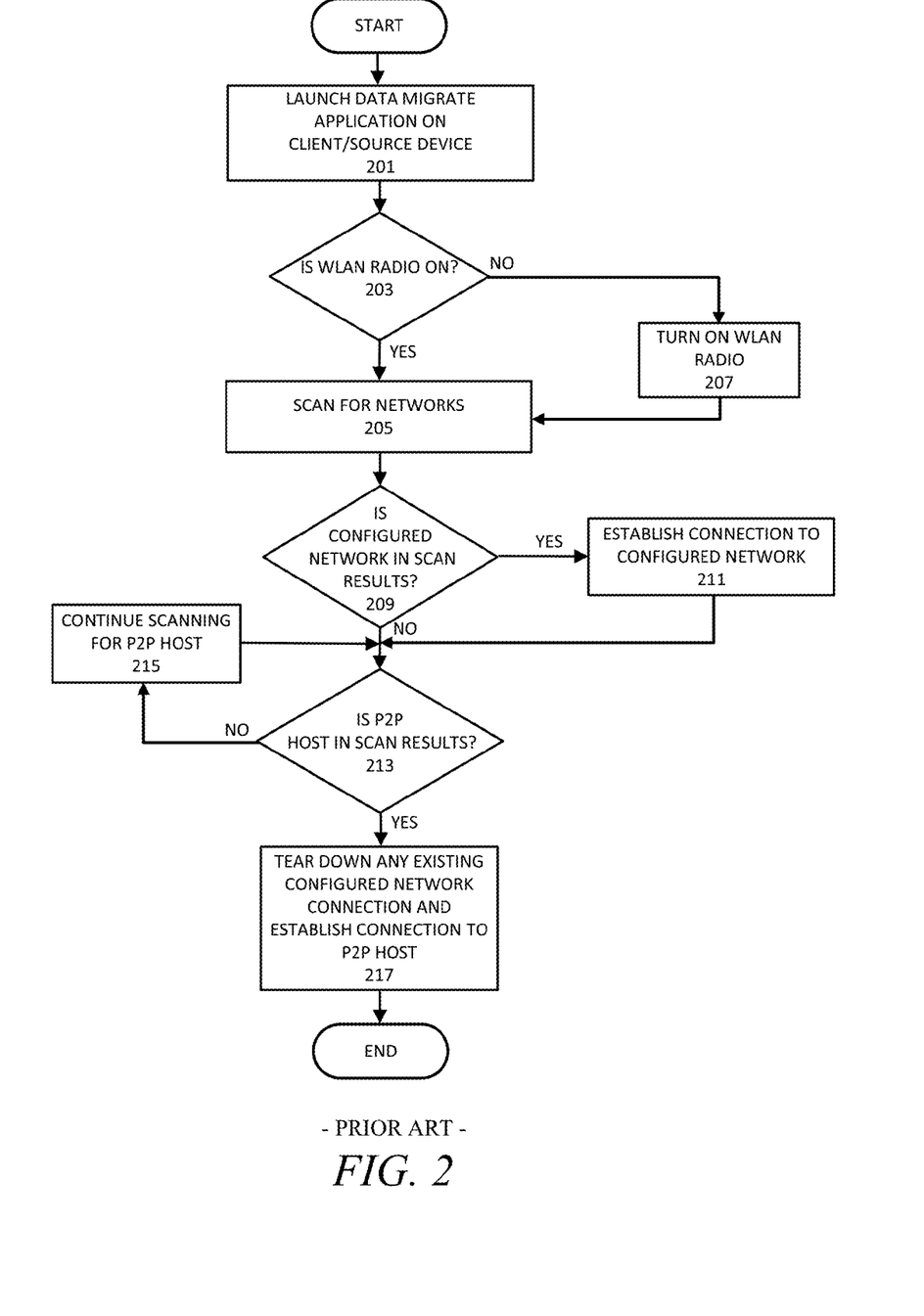
FIG. 2 is a flow chart showing an existing, known method of operation of a mobile device.

FIG. 2 is a flow chart showing an existing, known method of operation of a mobile device. In the prior system illustrated in FIG. 2, the source mobile device would launch a client-side data migrate application as shown in operation block 201. If the WLAN radio hardware is turned on in decision block 203, then the WLAN radio hardware would begin to scan for networks as shown in operation block 205. If the WLAN radio hardware is not turned on in decision block 203, then the data migrate application would turn on the WLAN radio hardware as shown in operation block 207.

After scanning for networks in operation block 205, the mobile device WLAN radio hardware checks to see if the scan results include a configured network as shown in decision block 209. In other words, the WLAN radio hardware reads the configured networks list stored in memory of the first mobile device to see if it contains any network it detected in the scan results. If yes, then the WLAN radio hardware will establish a connection to one of the configured networks in operation block 211. If the scan results did not include a configured network, the method of operation proceeds to decision block 213.

In decision block 213, the data migrate application checks the scan results to see if the peer-to-peer host (i.e. the second mobile device) was detected by the WLAN baseband hardware. If not, the process proceeds to operation block 215 and continue to scan for the peer-to-peer host. Once the peer-to-peer host is detected in decision block 213, the process proceeds to operation block 217 and tears down any previous connection to a configured network prior to establishing a peer-to-peer connection with the second mobile device.

The flowchart of FIG. 2 illustrates at least two difficulties that are resolved using the methods and apparatuses of the present disclosure. For example, as illustrated in operation block 205, the radio equipment will automatically begin the scan for networks regardless of the reason why the radio hardware was turn on. The WLAN radio hardware will also establish a connection to any detected configured network as shown in operation block 211, even though this is not desirable when the user wishes to set up a peer-to-peer connection to perform the data transfer operation. More particularly, a connection to a detected configured network (such as the user's home network) is necessarily established initially in the prior systems and must be subsequently torn down, as shown in operation block 217, prior to establishing the desired peer-to-peer connection.

Furthermore, if any configured networks are present in the scan results obtained in operation block 205, radio resources will be utilized in monitoring radio parameters, and possibly other criteria, received from the detected configured networks. Additionally, if the peer to peer connection is lost due to radio interference or any other reason, the WLAN radio hardware will proceed to scan for networks again in operation block 205 and will subsequently establish a connection to a configured network in operation block 211. These operations take time away from the desired data transfer being performed using the peer-to-peer connection. In other words, after loss of the peer-to-peer connection the WLAN radio hardware will first form a connection to configured network and will have to again tear down that connection down prior to reestablishing the desired peer-to-peer connection. These operations not only require additional time, but also consume battery resources and may drain the battery prior to completing the data transfer operation.

Figure 3:
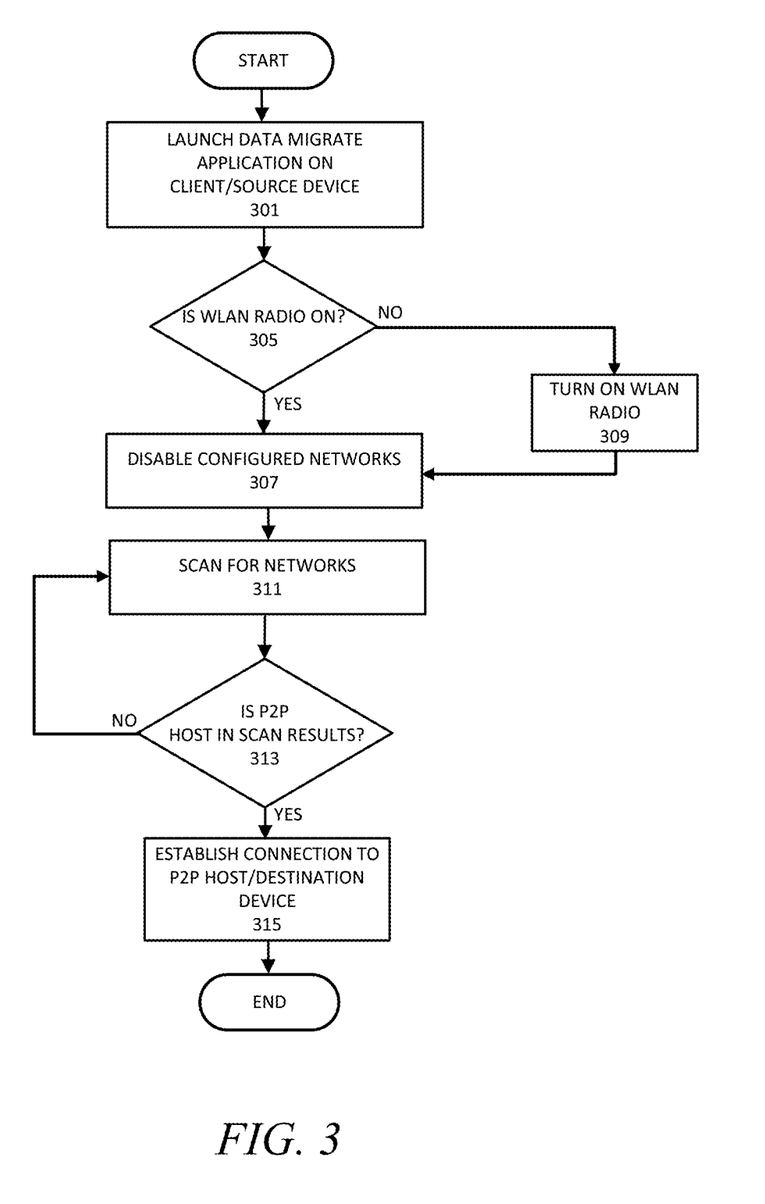
FIG. 3 is a flow chart showing operation of a mobile station in accordance with various embodiments.

FIG. 3 is a flow chart showing operation of a mobile station in accordance with various embodiments. More particularly, the method of operation illustrated in FIG. 3 resolves the difficulties associated with the prior system's method of operation discussed above with respect to FIG. 2. In the flowchart of FIG. 3, a first mobile device may launch a client-side data migrate application in operation block 301, such that the first mobile device will act as a source device for the data transfer operation. If the WLAN radio hardware is not turned on in decision block 305, the WLAN radio hardware will be turned on as shown in operation block 309. If the WLAN radio hardware was already on in decision block 305, or after it was turned on in operation block 309, the method proceeds to operation block 307 and the data migrate application disables any configured networks on the first mobile device. The WLAN radio hardware then proceeds to scan for networks in operation block 311. Because the configured networks are disabled in operation block 307, the WLAN radio hardware will not form any connections to those configured networks. Instead, the scan results will be reviewed for a second mobile device which will act as a peer-to-peer host. If the peer-to-peer host (i.e. second mobile device) is detected in the scan results in decision block 313, the method proceeds to operation block 315 and establishes a connection to the peer-to-peer host using the WLAN radio hardware. If the peer-to-peer host is not detected (that is, if it does not appear in the scan results in decision block 313) the WLAN radio hardware continues to scan in operation block 311 until the peer-to-peer host is detected. The method of operation then ends as shown. If the peer-to-peer connection is lost due to interference or for some other reason, the WLAN radio hardware will not form any connections to the configured networks because they have been disabled previously in operation block 307. Therefore, in accordance with the embodiment illustrated by the flowchart of FIG. 3, the WLAN radio hardware will instead reestablish the peer-to-peer connection to the second mobile device after it is detected in the scan results in decision block 313, rather than connecting to a configured network.

Among other advantages, the disclosed embodiments save time in reestablishing lost peer-to-peer connections such that the data transfer operation can be completed in less time. Another advantage therefore, is that battery power is conserved because the connections formed during the data transfer operation are limited to the desired peer-to-peer connection to the second mobile device.

Figure 4:
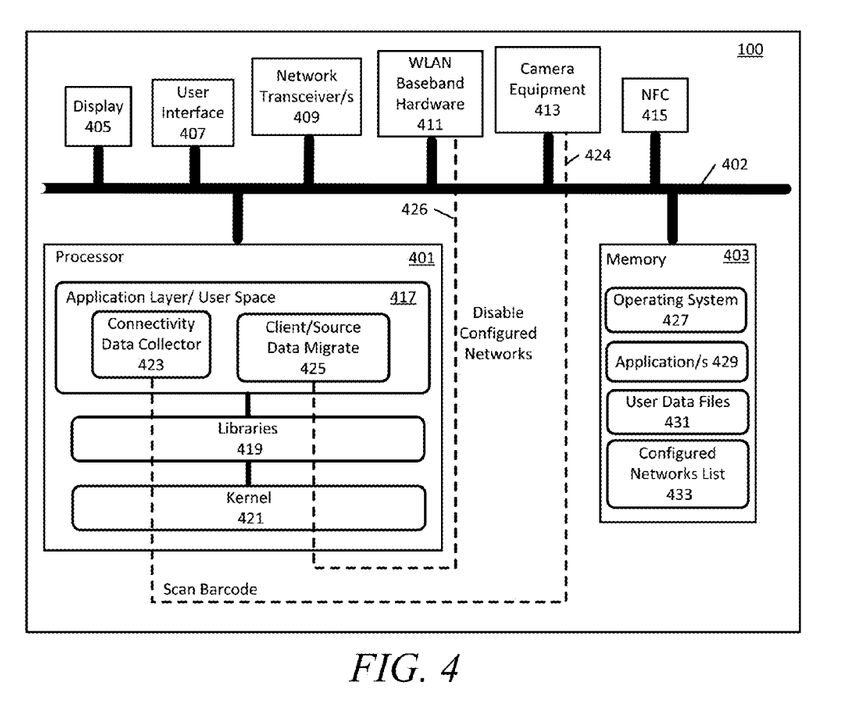
FIG. 4 is block diagram of a mobile device illustrating sending a disable saved networks command from an application layer to wireless local area network baseband hardware in accordance with an embodiment.

FIG. 4 is block diagram of the first mobile device 100 and illustrates a "disable configured networks" command 426 sent from an application layer 417 to WLAN baseband hardware 411 in accordance with an embodiment. Both the first mobile device 100 and the second mobile device 101 include like components. For example, both the first mobile device 100 and the second mobile device 101 include a processor 401, display 405, user interface 407, one or more wide area network transceivers 409 (such as, but not limited to CDMA, UMTS, GSM, etc.), WLAN baseband hardware 411, and memory 403. All of the components shown are operatively coupled to the processor 401 by one or more internal communication buses 402.

The memory 403 stores an operating system 427 that, when executed by the processor 401, provides the application layer (or user space) 417, libraries 419 (also referred to herein as "application programming interfaces" or "APIs") and a kernel 421. The memory 403 also stores various applications 429, user data 431 and a configured networks list 433. The WLAN baseband hardware 411 scans for networks and produces a scan result that may include one or more detected networks. The WLAN baseband hardware 411 compares the detected networks in the scan result with the configured networks list 433. If one of the detected networks in the scan result is present in the configured network list 433, then the WLAN baseband hardware 411 will select one of the networks and establish a connection. The selected configured network may be selected based on various criteria such as, but not limited to, radio parameters such as signal strength, data throughput and availability, services provided or some other criteria, etc. More particularly, the WLAN baseband hardware 411 evaluates criteria of the detected configured networks and makes a decision regarding which network to form a connection with.

In addition to the components discussed above, the first mobile device 100 may also include camera equipment 413 and/or near field communication (NFC) hardware 415. In some embodiments, the user of the first mobile device 100 may download a connectivity data collector application 423, in addition to a client-side data migrate application 425. Both of these applications may be stored in the memory 403 along with the applications 429, or may be immediately executed by the processor 401. The connectivity data collector application 423 is operative to control camera equipment 413, if present on the first mobile device 100, and may send control signal 424 to operate the camera equipment 413 to scan a barcode located on a second mobile device. The barcode contains connectivity information for the second mobile device which may be used by the client-side data migrate application 425. In other embodiments, the connectivity data collector application 423 is operative to obtain second mobile device connectivity information using the NFC hardware 415, when it is brought within an appropriate proximity of the second mobile device 101. In accordance with the various embodiments, other techniques may also be used to obtain the second mobile device 101 connectivity information. For example, a high-frequency audio signal may be transmitted from the second mobile device 101 to the first mobile device 100 in embodiments where both mobile devices have the appropriate capability to transmit and receive such high-frequency audio signals.

The client-side data migrate application 425 uses the obtained connectivity information from the second mobile device 101 to control the WLAN baseband hardware 411 accordingly to establish a peer-to-peer connection 103. The first mobile device 100 may then use the peer-to-peer connection 103 to perform the data transfer 105 as was discussed previously with respect to FIG. 1. The data transfer 105 may transfer any of the user data 431 stored in memory 403, which may include transfer of files, or performing a streaming media session, or etc. The client-side data migrate application 425 determines when the data transfer 105 operation is completed, and sends the indication 107 to the second mobile device 101 over the peer-to-peer connection 103.

The client-side data migrate application 425 disables configured networks stored in the configured networks list 433 such that the WLAN baseband hardware 411 will not form connections with any of the configured networks even if those configured networks appear in the network scan result. The details of operation of the first mobile device 100 as illustrated in FIG. 4 are best understood in conjunction with the flowchart of FIG. 5.

Figure 5:
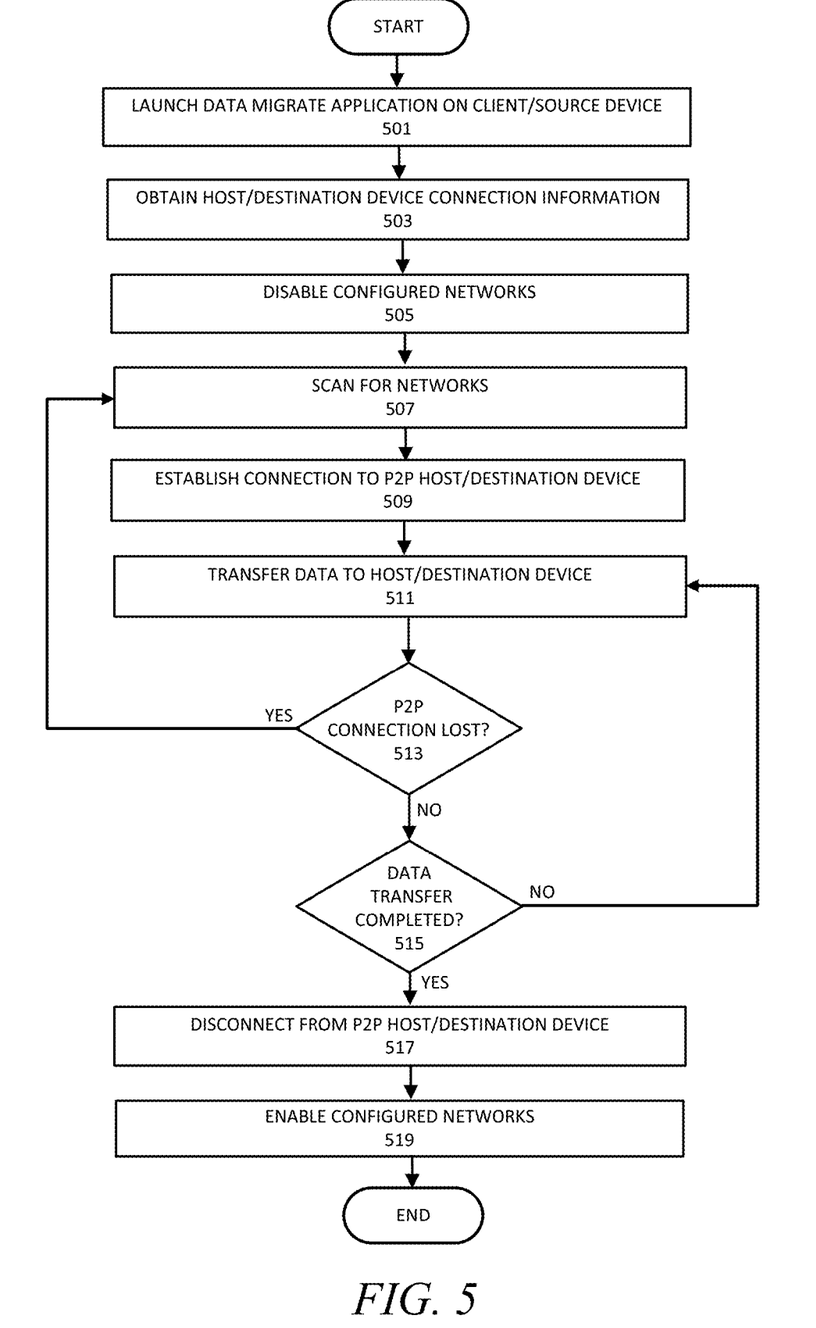
FIG. 5 is a flow chart showing operation of a mobile station in accordance with various embodiments.

Beginning in operation block 501, the processor 401 launches the client-side data migrate application 425. In operation block 503, connectivity information for the second mobile device 101 is obtained. As was described above, the connectivity information may be obtained by the connectivity data collector application 423 using any appropriate mechanism such as, but not limited to, scanning a barcode with the camera equipment 413, or obtaining the connectivity information using NFC hardware 415. In operation block 505, the client-side data migrate application 425 sends a "disable configured networks" command 426 to the WLAN baseband hardware 411. The disable configured networks command 426 may be implemented by performing an API call by the application layer 417, using an appropriate API from libraries 419. It is to be understood that the API and application layer 417 may also utilize services of the kernel 421 as necessary to communicate with the WLAN baseband hardware 411.

Disabling configured networks in operation block 505 means that any configured networks in the configured networks list 433 will not be connected with even if any of these configured networks show up in the scan results obtained by the WLAN baseband hardware 411 during the scanning operation the occurs in operation block 507. If the desired peer-to-peer host device, such as second mobile device 101, is in proximity and detected during the scan of operation block 507, a peer-to-peer connection is established as shown in operation block 509. The first mobile device 100 may then proceed to perform the data transfer 105, and transfer data to the second mobile device 101 in operation block 511. The second mobile device 101 executes the host-side data migrate application and is the destination device for the data transfer 105.

If the peer-to-peer connection is lost as shown in decision block 513, the WLAN baseband hardware 411 will proceed to scan for networks again in operation block 507. However, because the configured networks list 433 has been disabled in operation block 505, the WLAN baseband hardware 411 will only establish a connection to the second mobile device 101 when it appears in the scan results. The first mobile device 100 will then continue where it left off in the data transfer 105, until the data transfer is completed in decision block 515. If it is not completed, the data transfer 105 continues in operation block 511. After the data transfer 105 is completed in decision block 515, the client-side data migrate application 425 controls the WLAN baseband hardware 411 to disconnect from the peer-to-peer connection 103 as shown in operation block 517. The client-side data migrate application 425 then enables the configured networks in the configured network list 433 as shown in operation block 519, and the method of operation ends. The WLAN baseband hardware 411 may then proceed to establish a connection to any of the configured networks that appear in the scan results.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method, comprising:
   preventing a first mobile device from connecting to configured networks having connectivity information stored in memory of the first mobile device;
   establishing a peer-to-peer connection with a second mobile device;
   performing a data transfer from the first mobile device to the second mobile device over the peer-to-peer connection while continuing to prevent the first mobile device from connecting to the configured networks; and
   enabling the first mobile device to connect to the configured networks after completion of the data transfer.

2. The method of claim 1, further comprising:
   scanning for networks by the first mobile device and detecting the second mobile device.

3. The method of claim 1, wherein preventing the first mobile device from connecting to configured networks, comprises:
   disabling the configured networks in a configured networks list stored in memory of the first mobile device.

4. The method of claim 3, further comprising:
   sending an indication to the second mobile device that the data transfer has been completed; and
   enabling the configured networks in the configured networks list of the first mobile device in response to completion of the data transfer.

5. The method of claim 3, further comprising:
   detecting, by the first mobile device, that the peer-to-peer connection with the second mobile device has been lost;
   determining that the data transfer to the second mobile device has not been completed; and
   reestablishing the peer-to-peer connection with the second mobile device to resume the data transfer while continuing to prevent the first mobile device from connecting to configured networks.

6. The method of claim 1, wherein preventing the first mobile device from connecting to configured networks, comprises:
   sending a command from an application layer of the first mobile device to a radio baseband layer of the first mobile device, to disable configured networks.

7. The method of claim 6, wherein sending the command comprises:
   performing a remote call of an application programming interface of the first mobile device radio baseband layer.

8. The method of claim 1, wherein preventing the first mobile device from connecting to configured networks comprises:
   preventing the first mobile device from connecting to a home network where the home network is one of the configured networks.

9. The method of claim 1, further comprising:
   obtaining connectivity information for the second mobile device; and
   storing the second mobile device connectivity information in the first mobile device.

10. The method of claim 9, wherein obtaining connectivity information for the second mobile device comprises:
    reading a barcode, by the first mobile device, the barcode located on the second mobile device, using camera equipment of the first mobile device, where the barcode includes connectivity information for the second mobile device; and
    storing the connectivity information for the second mobile device in the first mobile device.

11. A system, comprising
    a first mobile device and a second mobile device, each mobile device respectively comprising:
    a processor;
    wireless local area network (WLAN) radio baseband hardware, operatively coupled to the processor; and
    memory, operatively coupled to the processor and to the wireless local area network radio baseband hardware; and
    wherein the first mobile device processor is configured to:
      prevent the first mobile device WLAN radio baseband hardware from connecting to configured networks having connectivity information stored in the first mobile device memory;
      establish a peer-to-peer connection with the second mobile device using the respective WLAN radio baseband hardware;
      perform a data transfer from the first mobile device to the second mobile device over the peer-to-peer connection while continuing to prevent the first mobile device WLAN radio baseband hardware from connecting to the configured networks; and
      enable the first mobile device WLAN radio baseband hardware to connect to the configured networks after completion of the data transfer.

12. The system of claim 11, wherein the first mobile device WLAN radio baseband hardware is configured to:
scan for networks and detect the second mobile device.

13. The system of claim 11, wherein the first mobile device processor is configured to prevent the first mobile device from connecting to configured networks by disabling the configured networks in a configured networks list stored in the first mobile device memory.

14. The system of claim 13, wherein the first mobile device processor is further configured to:
send an indication to the second mobile device that the data transfer has been completed; and
enable the configured networks in the configured networks list stored in the first mobile device memory in response to completion of the data transfer.

15. The system of claim 13, further wherein the first mobile device WLAN radio baseband hardware is further configured to:
detect that the peer-to-peer connection with the second mobile device has been lost; and
reestablish the peer-to-peer connection with the second mobile device to resume the data transfer while continuing to refrain from connecting to configured networks, in response to the first mobile device processor determining that the data transfer to the second mobile device has not been completed.

16. The system of claim 11, wherein the first mobile device processor is configured to prevent the first mobile device WLAN radio baseband hardware from connecting to configured networks by sending a command from an application layer executing on the first mobile device processor to the first mobile device WLAN radio baseband hardware to disable configured networks.

17. The system of claim 16, wherein the first mobile device processor is configured to send the command by performing a remote call of an application programming interface of the first mobile device WLAN radio baseband hardware.

18. The system of claim 11, wherein the first mobile device processor is configured to prevent the first mobile device WLAN radio baseband hardware from connecting to configured networks including preventing connecting to a home network where the home network is one of the configured networks.

19. The system of claim 11, wherein the first mobile device processor is further configured to:
obtain connectivity information from the second mobile device; and
store the second mobile device connectivity information in the first mobile device.

20. The system of claim 19, wherein the first mobile device further comprises:
camera equipment, operatively coupled to the processor; and
wherein the processor is further configured to:
control the camera equipment to read a barcode located on the second mobile device, where the barcode includes connectivity information for the second mobile device; and
store the connectivity information for the second mobile device.

* * * * *